United States Patent
Guempel et al.

(10) Patent No.: US 7,578,061 B2
(45) Date of Patent: Aug. 25, 2009

(54) METHOD AND DEVICE FOR PRESTRESSING TAPERED ROLLER BEARINGS OF A ROLLING MILL ROLLER

(75) Inventors: Markus Guempel, Forst (DE); Stefan Tammert, Hilchenbach (DE)

(73) Assignee: SMS Demag AG, Dusseldorf (DE)

( * ) Notice: Subject to any disclaimer, the term of this patent is extended or adjusted under 35 U.S.C. 154(b) by 555 days.

(21) Appl. No.: 10/576,556

(22) PCT Filed: Nov. 18, 2004

(86) PCT No.: PCT/EP2004/013104

§ 371 (c)(1),
(2), (4) Date: Apr. 18, 2006

(87) PCT Pub. No.: WO2005/061140

PCT Pub. Date: Jul. 7, 2005

(65) Prior Publication Data

US 2007/0039187 A1 Feb. 22, 2007

(30) Foreign Application Priority Data

Dec. 16, 2003 (DE) ................. 103 58 869

(51) Int. Cl.
*B21K 1/76* (2006.01)
(52) U.S. Cl. ...................... 29/898.09; 29/724
(58) Field of Classification Search ............. 29/898.09, 29/898, 724; 384/571; 492/1
See application file for complete search history.

(56) References Cited

U.S. PATENT DOCUMENTS

| | | | |
|---|---|---|---|
| 4,341,426 A | 7/1982 | Clapp | |
| 4,626,111 A | 12/1986 | Swasey et al. | |
| 4,692,040 A * | 9/1987 | Ebaugh et al. | 384/484 |
| 4,875,261 A * | 10/1989 | Nishida | 492/1 |
| 4,938,615 A * | 7/1990 | Baker | 384/571 |
| 5,600,987 A * | 2/1997 | Moritz et al. | 72/238 |

FOREIGN PATENT DOCUMENTS

EP 0425072 5/1991

OTHER PUBLICATIONS

Search Report.

* cited by examiner

*Primary Examiner*—David P Bryant
*Assistant Examiner*—Ryan J Walters
(74) *Attorney, Agent, or Firm*—Abelman, Frayne & Schwab

(57) ABSTRACT

For preloading a tapered roller bearing (1) secured with a conical seat on a tapering roll neck (3) of a roll (2), in particular, a back-up roll, arranged in a roll stand by means of a chock (4), by application of a hydraulic pressure thereto, the bearing inner ring (18), rollers, (17) and the bearing outer ring (17) of the tapered roller bearing (1) are subjected to pressure produced during rolling and are radially preloaded against the roll (2).

An annular pressure-applying device is supported on the roll (2) by an axial bearing provided on the roll end neck, is arranged against the bearing outer ring of the tapered roller bearing (1) and, upon application of pressure, displaces the chock (4) with the bearing outer ring (13) in a direction toward the roll body (15) or the roll (2) in an opposite direction.

9 Claims, 1 Drawing Sheet

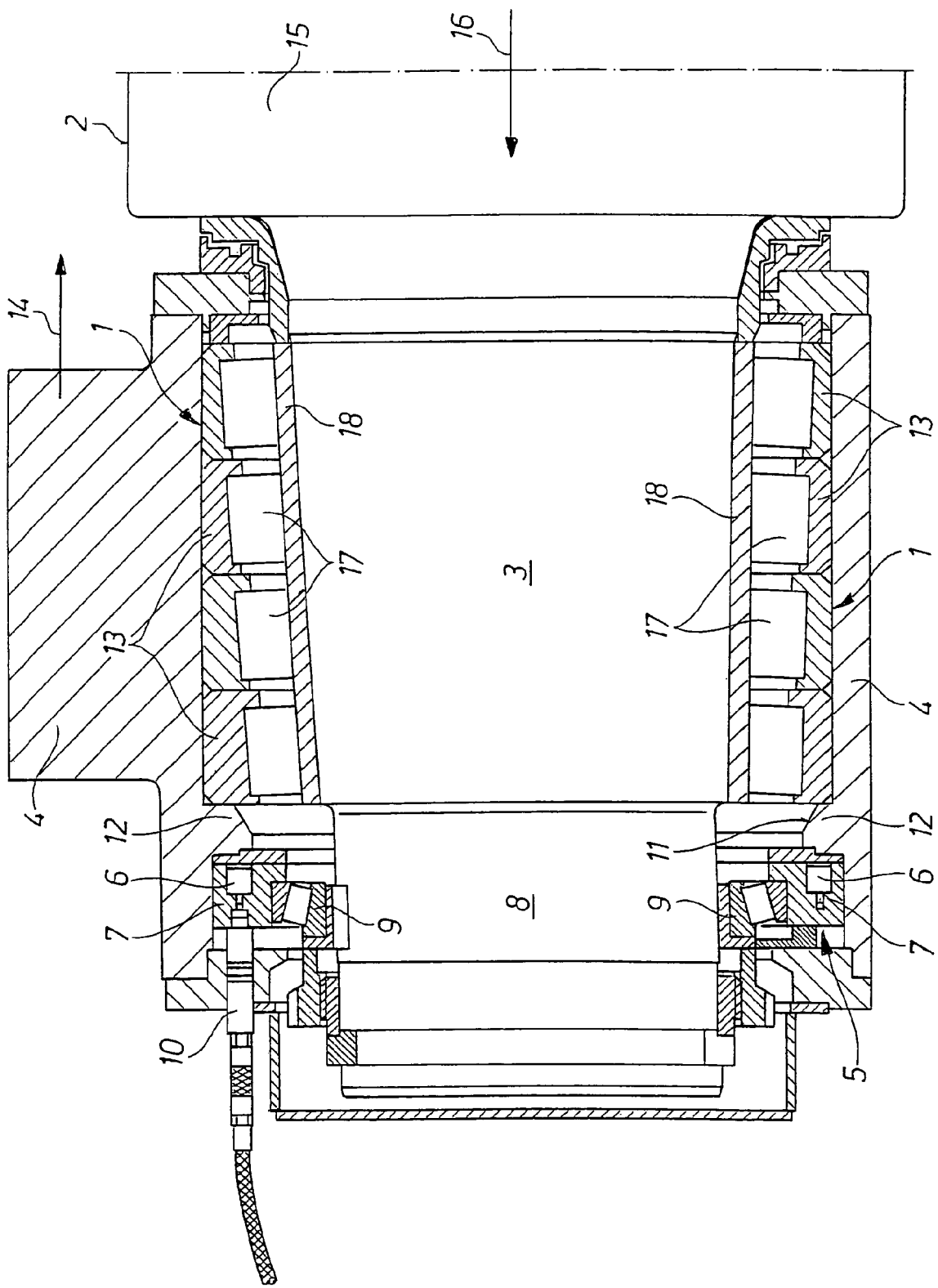

METHOD AND DEVICE FOR PRESTRESSING TAPERED ROLLER BEARINGS OF A ROLLING MILL ROLLER

The invention relates to a method and device for preloading a tapered roller bearing secured with a conical seat on a tapering roll neck of a roll, in particular, a back-up roll, arranged in a roll stand by means of a chock, by application of a hydraulic pressure thereto.

EP 0 425 072 B1 discloses a tapered roller bearing with a cone for a rolling mill roll. The cone has several inclined raceways facing outwardly, and several bearing outer rings with inclined raceways. In order to prevent sliding of the bearing inner rings which are, contrary, to the bearing outer rings, are not fixed, together with tapered rollers, off the roll neck, the tapered roller bearing is preloaded with four tension rods which act on chocks on the drive and operational sides, pressing them toward each other. Those are supported by springs arranged about the tension rods which apply an axial force; alternatively and/or in addition fluid-operated cylinders are provided. The tensions rods, which are necessary for holding the overall open system, not only require an expensive assembly but also lead to weakening of material because of the necessary therefore, through-bores.

De 195 04 401 C1 discloses a tapered roller bearing that is preloaded under high pressure and is released as a result of depressurization by using a hydraulic tensioning nut or a bearing adjusting ring or ring-shaped cylinder having a plurality of hydraulically connected with each other pistons. To this end, an intermediate thrust ring is pressed against the bearing inner ring by the pistons and associated therewith, spacers. After preloading of the tapered roller bearing, the spacers are removed, with the tensioning nut or bearing adjusting ring being depressurized but hydraulically locked. As a result, with this, a bearing backlash, i.e., the backlash between the bearing inner ring and the thrust ring takes place when pressure is applied to the bearing adjusting ring and then the ring is depressurized, so that it is not prevented that in the tapered bearing itself, i.e., between the bearing inner ring and the bearing surface of the conical roll neck, a backlash takes place.

It has been observed that during a rolling operation, with the known tapered roller bearings in which both ends of a roll are supported, unavoidably, chatter takes place, and resulting accompanied vibrations reduce the service life of the bearing. In addition, at very high rolling speeds, the quality of the rolled material is negatively influenced, so that maximum possible rolling speeds cannot be used. Thereby, a complete production output of a plant cannot be achieved.

Accordingly, the object of the invention is to provide a method and a device of the type described above that would provide for a vibration-free roll support, in particular, back-up roll support and, thereby, for an extended service life of the bearing, and with which the above-mentioned drawbacks are eliminated.

This object is achieved, according to the invention, with a method in which the bearing inner ring, rollers, and the bearing outer ring of the tapered roller bearing are subjected to pressure produced during rolling and are radially preloaded against the roll.

Thereby, it is achieved that the tapered roller bearing itself is always backlash-free, i.e., during the entire operation, no air layer exists between the bearing inner ring, rollers and the bearing outer ring. The phenomenon of chatter does not occur any more because the bearing rollers always bear against the raceway due to the preload acting on the roll. As research has shown, the bearing service life noticeably increases in comparison with conventional bearings (almost doubles). In addition, the production output of the plant increases. Besides, mounting and dismounting of the roll with the tapered roller bearings becomes possible, because the parts can be held together and cannot fall one from another.

According to a preferred embodiment of the invention, a tapered roller bearing, which is provided at each roll end, is preloaded with a pre-set hydraulic pressure or alternatively, the preload is controlled, dependent on the rolling force. At each end or side of the roll, there is provided a closed system, whereby the rolling force-dependent regulation of the preload enables a dynamic bearing preloading or tensioning. When the rolling force increases, the hydraulic pressure increases and the other way around.

According to the invention, the device for carrying out the method is formed as an annular pressure-applying device that is supported on the roll by an axial bearing provided on the roll end neck, is arranged against bearing outer ring of the tapered roller bearing and, upon application of pressure, displaces the chock with the bearing outer ring in a direction toward the roll body or displaces the roll in the opposite direction.

With the pressure-applying device being formed, advantageously, as a ring-shaped cylinder with a plurality of hydraulically connected separate pistons, or, alternatively, as an annular piston, and being supported on an axial bearing, e.g., tapered or tumbled roller bearing, and with the pressure being applied to the bearing outer ring of the tapered roller bearing, with the displacement of either of a chock in the roll longitudinal direction to the roll body or displacement of the roll in the opposite direction, i.e., outwardly, the tapered roller bearing is radially preloaded against the roll so that no backlash exists in the tapered roller bearing.

According to the invention, for transmission of the pressure force between the pressure-applying device and the bearing outer ring of the tapered roller bearing, there is provided a thrust ring which is formed, according to an embodiment of the invention, as a radially inwardly extending collar formed as one-piece with the chock.

When the pressure-applying device and the axial bearing are arranged in the chock, the entire self-supported system, which is closed on each side of the roll, is not visible from outside and is protected.

Further features and particularities of the invention follow from the claims and the following description of an embodiment of the invention shown in a single drawing.

The drawing shows a cross-sectional view, as a unit of a conventional roll stand, not shown further, an end of a roll 2 which is supported, at its opposite ends, respectively, in a tapered roller bearing 1. The multi-row tapered roller bearing 1 is secured with a conical seat on a tapering outwardly roll neck 3 and is arranged in a roll stand chock 4. On each side or at each end of the roll 2, an annular pressure-applying device 5 is arranged in the chock 4 which is formed as a ring-shaped cylinder 7 having a plurality of separate pistons 6 and supported relative to the roll 2 by an axial tapered roller bearing 9 arranged on a cylindrical roll end neck 8. The ring-shaped cylinder 7 and, thereby, its separate pistons 6 are connected by a conduit connector 10 with a pressure medium source, not shown.

The ring-shaped cylinder 7, which is supported in the roll chock 4 by the axial bearing 9, acts, upon application of pressure to its separate pistons 6, via a thrust ring 11, which is formed as an extending radially inwardly collar 12 formed as one-piece with the roll chock 4, directly on the bearing outer ring 13 of the tapered roller bearing 1 and displaces the roll chock 4 in the direction of arrow 14 towards the roll body 15 or displaces the roll 2 in the opposite direction according to arrow 16. Thereby, the bearing outer ring 13 is radially preloaded against the roll 2, whereby the tapered roller bearing 1 is constantly arranged backlash-free, i.e., no air layer exists between the bearing outer ring 13, rollers 17, and bearing inner ring 18. The rollers 17 always bear against the bearing inner ring 18 with a large contact surface.

The ring-shaped cylinder 7 is permanently subjected to pressure so that the tapered roller bearing 1 is backlash-free and preloaded against the roll during the entire rolling operation. Thus, the ring-shaped cylinder 7, which cannot be released without application pressure thereto, enables a dynamic, rolling force-dependent regulation. Thereby, the roll support is vibration-free and insures an extended service life at high roll speeds. This enables simultaneously increase of production at a high quality of a rolled stock.

The invention claimed is:

1. A method of preloading a tapered roller bearing (1) secured with a conical seat on a tapering roll neck (3) of a roll (2), in particular, a back-up roll, arranged in a roll stand by means of a chock (4), by application of a hydraulic pressure thereto, a bearing inner ring (18), rollers, (17) and a bearing outer ring (13) of the tapered roller bearing (1) being subjected to pressure produced during rolling and being radially preloaded against the roll (2), characterized in that the tapered roller bearing (1) is preloaded by an annular pressure applying device (5) arranged on each side of the roll (2) in the chock (4) and supported relative to the roll (2), and in that upon application of pressure, the pressure applying device (5) displaces the chock (4) with the bearing outer ring (13) in a direction toward the roll (2) or displaces the roll (2) in an opposite direction.

2. A method according to claim 1, characterized in that the tapered roller bearing (1) is preloaded with a pre-set hydraulic pressure.

3. A method according to claim 1, characterized in that the tapered roller bearing (1) is preloaded in a controlled manner dependent on the rolling force.

4. A device for preloading a tapered roller bearing (1) secured with a conical seat on a tapering roll neck (3) of a roll (2), in particular, a back-up roll, arranged in a roll stand by means of a chock (4), by application of a hydraulic pressure thereto, with a bearing inner ring (18), rollers (17) and a bearing outer ring (13) of the tapered roller bearing (1) being subjected to pressure produced during rolling and being radially preloaded against the roll (2), characterized in that an annular pressure-applying device (5) is supported on the roll (2) by an axial bearing (9) provided on the roll end neck (8), is arranged against the bearing outer ring (13) of the tapered roller bearing (1) and, upon application of pressure, displaces the chock (4) with the bearing outer ring (13) in a direction toward the roll (2) or displaces the roll (2) in an opposite direction.

5. A device according to claim 4, characterized in that the pressure-applying device (5) is a ring-shaped cylinder (7) with a plurality of separate pistons (6).

6. A device according to claim 4, characterized in that the pressure-applying device (5) is an annular piston.

7. A device according to claim 4, characterized in that the pressure-applying device (5) and the axial bearing (9) are arranged in the chock (4).

8. A device according to claim 4, characterized in that between the pressure-applying device (5) and the bearing outer ring (13) of the tapered roller bearing (1), a thrust ring (11) is provided.

9. A device according to claim 8, characterized in that the thrust ring (11) is formed as an extending radially inwardly collar (12) formed as one-piece with the chock (4).

* * * * *

UNITED STATES PATENT AND TRADEMARK OFFICE
CERTIFICATE OF CORRECTION

PATENT NO. : 7,578,061 B2 Page 1 of 1
APPLICATION NO. : 10/576556
DATED : August 25, 2009
INVENTOR(S) : Guempel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this

Seventh Day of September, 2010

David J. Kappos
*Director of the United States Patent and Trademark Office*